(12) United States Patent
Fischer

(10) Patent No.: US 6,628,721 B1
(45) Date of Patent: Sep. 30, 2003

(54) SIMPLIFIED DIFFERENTIAL SIGNALING

(75) Inventor: Jonathan Herman Fischer, Blandon, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/448,934

(22) Filed: Nov. 24, 1999

(51) Int. Cl.[7] .................................................. H04B 3/06
(52) U.S. Cl. ..................................................... 375/257
(58) Field of Search ............................... 375/259, 257, 375/220, 219, 222, 295, 296; 327/107, 108, 110, 52, 53, 56, 65, 68, 72, 77, 89, 404, 407, 408; 326/20, 21, 26, 27, 30, 83, 119, 121, 34

(56) References Cited

U.S. PATENT DOCUMENTS

| | | | | |
|---|---|---|---|---|
| 4,987,322 A | * | 1/1991 | Wheeler | 327/108 |
| 5,347,538 A | * | 9/1994 | Marbot | 375/219 |
| 5,550,496 A | * | 8/1996 | Desroches | 327/108 |
| 5,568,064 A | * | 10/1996 | Beers et al. | 326/31 |
| 5,920,234 A | * | 7/1999 | Hill | 331/75 |
| 5,977,796 A | * | 11/1999 | Gabara | 326/86 |
| 6,084,426 A | * | 7/2000 | Allen | 326/31 |
| 6,295,323 B1 | * | 9/2001 | Gabara | 375/257 |
| 6,320,429 B1 | * | 11/2001 | Yano | 327/89 |

\* cited by examiner

*Primary Examiner*—Chi Pham
*Assistant Examiner*—Khanh Cong Tran

(57) ABSTRACT

A method and apparatus for transmitting and receiving digital data in a noisy environment. Digital data is transmitted with a degree of noise immunity by generating and transmitting a reference signal along with the transmitted digital data signal. The reference signal has a voltage level between a logic level low and a logic level high of the digital data signal. The reference signal can be used to identify the center point of the transmitting device logic levels. Furthermore, the reference signal allows the receiver to track and compensate for noise introduced at the transmitter of the digital data signal.

13 Claims, 3 Drawing Sheets

SIMPLIFIED DIFFERENTIAL SIGNALING

FIELD OF THE INVENTION

This invention relates to apparatus and methods for transmitting data. More particularly, the invention concerns apparatus and methods for reducing noise in transmitted data.

BACKGROUND OF THE INVENTION

In a traditional "single-ended" data transmission system, a varying data signal is sent over a communication channel by varying a signal attribute, such as current or voltage. For example, in digital data transmission, sending a 0 volt signal may indicate a logic level low (i.e. a digital zero bit), while sending a 5 volt signal may indicate a logic level high (i.e. a digital one bit). This conventional method of data transmission is adequate if the signal levels are widely spaced and well defined. However, power consumption by electronic devices is a major issue. To address the power consumption concern, the supply voltages and the separation between different data levels has been significantly reduced. Unfortunately, single-ended data transfers are relatively susceptible to noise when data level separation is reduced. Even small amounts of noise can seriously degrade the reliability of a single-ended data transmission system having reduced data level separation.

A conventional solution to noise degradation is to use a differential mode of signaling. In differential signaling, a single data signal is transmitted over two wires, each of which carries one signal component. The two components are generally derived from the same source data signal and are varied such that the data signal is transmitted as the difference between the two signal components. In digital environments, differential data signals are typically transmitted as two voltage signals of opposite polarity relative to a reference level. The transmitted data is extracted by determining which signal components has a greater voltage.

Differential mode signaling provides for improved noise immunity and greater noise tolerance, and is therefore widely used to interconnect digital circuits on separate chips and circuit boards. However, a significant problem with differential signaling is that two wires are required to transmit one data signal.

Accordingly, it is desirable to improve the ratio of transmitted data signals to wires used, while retaining the good noise immunity associated with standard two-wire differential signaling.

SUMMARY OF THE INVENTION

Digital data can be transmitted in a noisy environment with a degree of noise immunity, according to the invention, by transmitting a digital data signal, generating a reference signal and transmitting the generated reference signal. The reference signal has a voltage level between a logic level low and a logic level high of the digital data signal.

Another embodiment of the invention provides for an integrated circuit having a transmitter for transmitting a digital data signal, and a reference circuit for generating and transmitting a reference signal. The generated reference signal has a voltage level between a logic level low and a logic level high of the digital data signal.

In accordance with a further embodiment of the invention, a receiver is provided for receiving a digital signal and a reference signal. The receiver includes a switch circuit and a comparator. The switch circuit generates a switching point signal as a function of the reference signal, and the switching point signal identifies the transition between a logic level low and a logic level high in the received digital signal. The comparator compares the received digital signal with the switching point signal. Based on this comparison, the comparator determines whether the received digital signal is a logic level low or a logic level high.

BRIEF DESCRIPTION OF THE DRAWINGS

The features and advantages of the invention will be apparent from the following description, as illustrated in the accompanying Figures in which like reference characters refer to the same elements throughout the different views.

DETAILED DESCRIPTION

Figure 1:
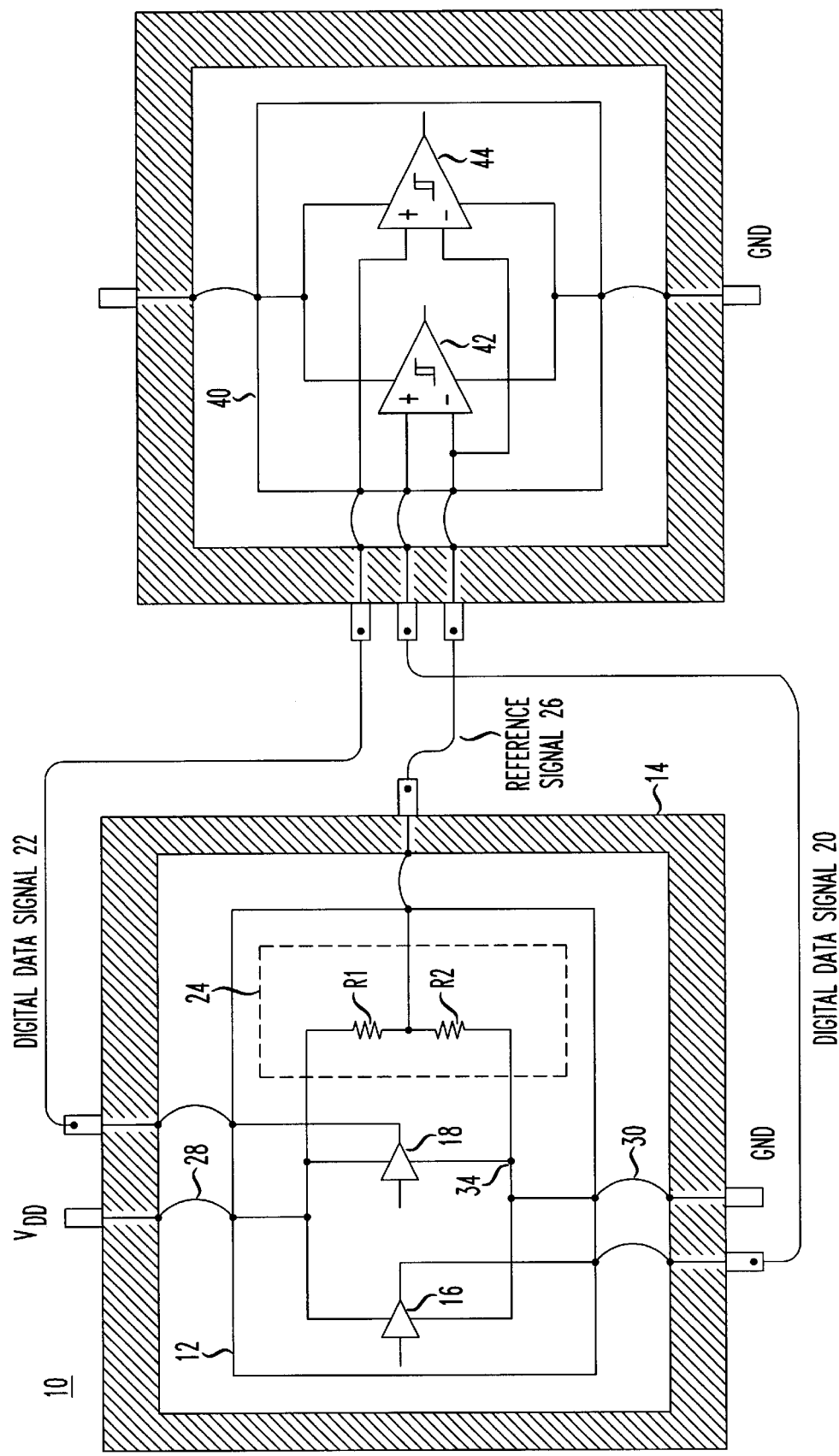
FIG. 1 is a schematic illustration of a system including a transmitter and a receiver for communicating digital data, in accordance with the invention.
Figure 3:
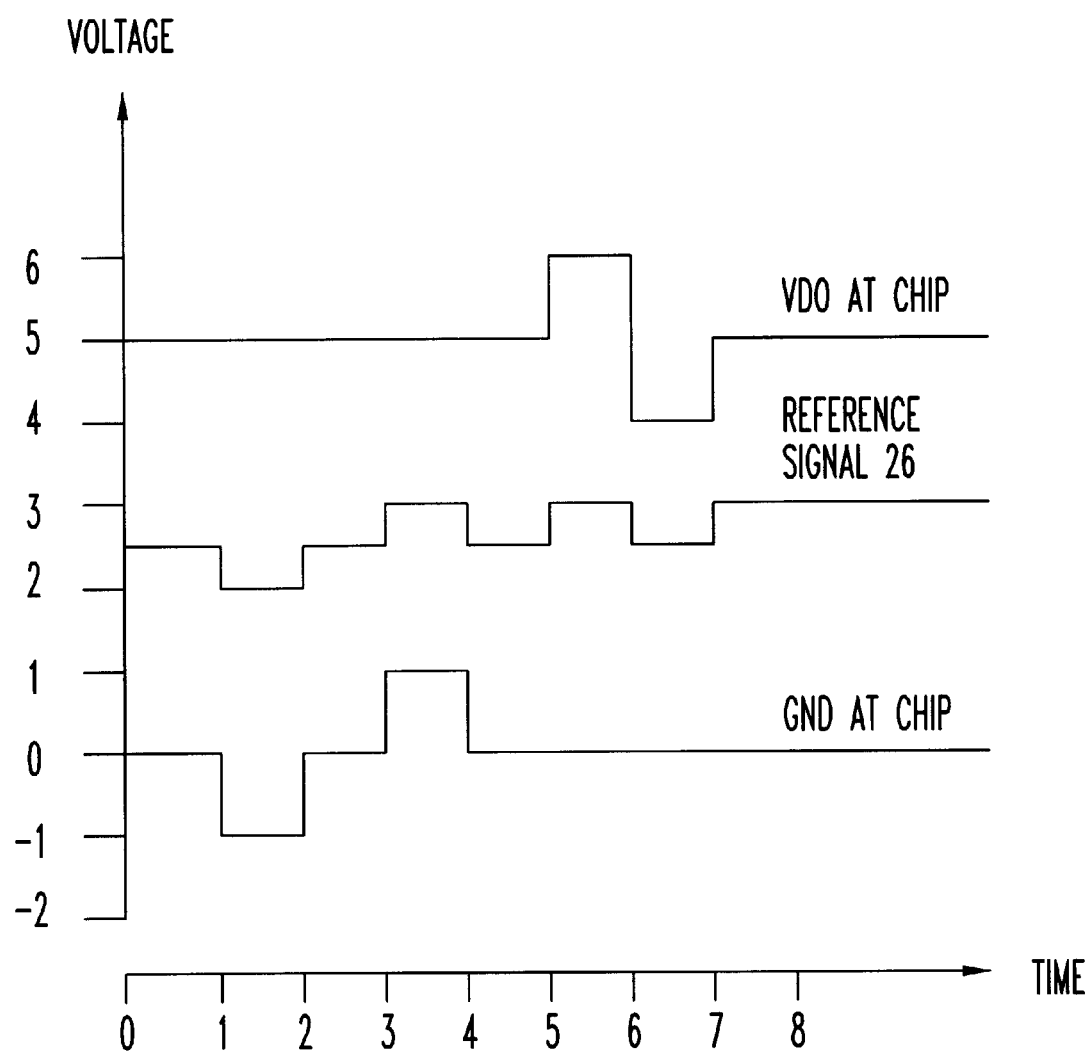
FIG. 3 is a timing diagram showing the change over time of the reference signal of FIG. 1.

FIG. 1 shows an integrated circuit 12 for transmitting a digital data signal 20. The integrated circuit 12 has a transmitter 16 for transmitting the digital data signal 20. The integrated circuit 12 also includes a reference circuit 24 for generating and transmitting a reference signal 26. The reference signal 26 has a voltage level between a logic level low and a logic level high, as shown in FIG. 3. The illustrated transmitter proves particularly advantageous when transmitting digital data in a noisy environment, such as in the presence of noise caused by parasitic inductance. $V_L$ FIG. 1 illustrates an electronic component 10 formed from the integrated circuit 12 and a package 14. A wire bond 28 connects the Vdd connection (i.e. power source) from the package 14 to the integrated circuit 12. A similar wire bond 30 connects the GND connection (i.e. return for the power source) from the package 14 to the integrated circuit 12. The package 14 and the wire bonds 28, 30 effect the overall noise of the electronic component 10. Particularly, the induced voltage on the GND and Vdd pins of the package 14, caused by the transient currents of a switching capacitive load, are a major contributor to noise in an electronic component having CMOS circuits. The voltage transient on the ground pin can be characterized according to the equation:

$$V_L(t) = -L_P C_L \frac{d^2 V_o(t)}{dt^2}$$

wherein:
$V_L$=voltage transient on the ground pin,
$L_p$=self inductance on the ground pin,
$C_L$=load capacitance
$d^2V$=change in the slope of the transition edge, and
dt=change in the time of the transition edge.

To reduce the noise causing induced voltage on the GND and Vdd pins, the self inductance, $L_p$, of the ground pin needs to be addressed. The self inductance, or package inductance, is dependent upon a number of factors including the length of the wire bonds and the location of Vdd and GND pins in the package. Accordingly, noise in the CMOS circuit depends upon the wire bond lengths and the location of Vdd and GND pins.

One technique for reducing the package inductance attempts to reduce the length of the wire bonds 28,30, thereby reducing the self inductance associated with the Vdd and GND signals. However, the wire bonds on the Vcc and GND pins will always have some finite length and an associated parasitic inductance. Accordingly, this invention overcomes the noise caused by self-inductance by generating and transmitting the reference data signal 26 along with the digital data signal 20. A receiver circuit can then compensate for the parasitic inductance in the transmitter 16 by using the reference signal 26 to track the noise caused by the parasitic inductance.

With further reference to FIG. 1, a second integrated circuit 40 is shown having a first receiver 42 and a second receiver 44. The first integrated circuit 12 can include two or more transmitters 16, 18. Each of the transmitters can transmit a digital data signal over the communication channel. In particular, transmitter 16 transmits the digital data signal 20 which is received by the first receiver 42, and transmitter 18 transmits the digital data signal 22 which is received by the second receiver 44.

The integrated circuit also includes the reference circuit 24 for generating the reference signal 26. Typically, only one reference signal 26 is generated for the entire set of digital data signals sent to the receiver. This invention uses n+1 data lines to send n bits of parallel information. The need for only one reference signal between the transmitters 16, 18 and the receivers 42, 44 improves the ratio of transmitted data signals to wires used, when compared to standard two-wire differential signaling. Moreover, the use of the reference signal 26 to account for noise resulting from self-inductance improves the noise immunity of the communication channel.

The reference circuit 24, that generates the reference signal 26, can be formed of a pair of resistive elements R1 and R2. The resistive elements R1, R2 are placed in series between the power source, Vdd, and a return for the power source, GND. The reference signal 26 is then generated at the connection between the resistive elements R1 and R2. Accordingly, in operation the reference signal 26 is at a voltage level between the power source voltage and the return for the power source.

The voltage level of the reference signal depends upon the value of the resistive elements R1 and R2. Preferably, the resistive elements R1 and R2 are equal. When resistance of R1 equals the resistance of R2, the reference signal 26 has a voltage level that is approximately midway between the voltage level of the power source and the return for the power source.

The voltage level of the reference signal 26 also depends upon the voltage level at node 32 and the voltage level at node 34. The voltage level at node 32 can differ from the voltage level applied at the Vdd pin of the package 14 and the voltage level at node 34 can differ from the ground signal applied at the GND pin of the package 14. The wire bonds 28, 30 and the package 14 act as parasitic inductors that cause the voltage at node 32 to differ from Vdd and the that cause the voltage at node 34 to differ from GND. Accordingly, the voltage level of the reference signal 26 depends upon the level of parasitic inductance in the electronic component 10. Any noise on the electronic component's internal supply rails (identified as nodes 32 and 34) can thus be tracked by the receiving devices 42, 44 via reference signal 26, such that the receiving devices can account for the noise levels at the electronic component 10.

Figure 2:
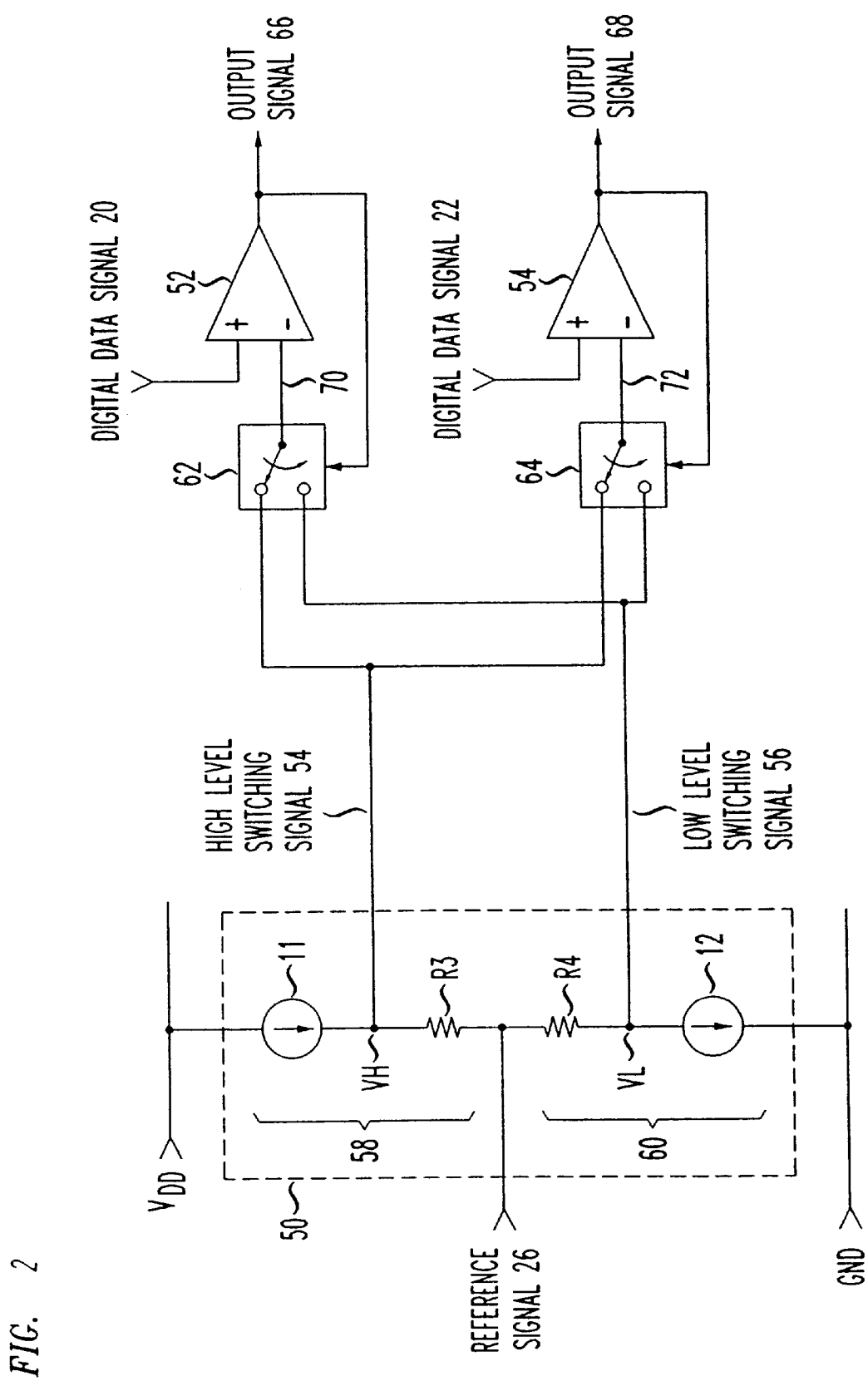
FIG. 2 is a shows a detailed schematic of the receiver of FIG. 1.

FIG. 2 shows a detailed schematic of the receivers 42 and 44 of FIG. 1. An illustrated receiver includes a switch circuit 50 and a comparator 52. The switch circuit 50 generates a switching point signal as a function of the input reference signal 26. The switching point signal, as illustrated in FIG. 2, can be either a high level switching signal 54 or a low level switching signal 56. In general, the switching point signal refers to a signal that identifies the transition point between a logic level low and a logic level high in a received digital data signal.

The receiver also includes a comparator 52. The comparator 52 compares the received digital data signal 20 with the switching point signal (i.e. with either switching signal 54 or switching signal 56). By comparing the digital data signal 20 with the switching point signal, comparator 52 can determine whether the received digital signal is a logic level low or a logic level high. The comparator 52 can then generate an output signal 66 representing either a logic level low or a logic level high. In general, the receiver adjusts the logic threshold levels of the comparator 52 to track the noise on the digital data signals.

In an analogous fashion, comparator 54 compares the digital data signal 22 with the switching point signal to determine whether the received digital data signal 22 is a logic level low or a logic level high. Comparator 54 can then generate an output signal 68 representing either a logic level low or a logic level high.

As further shown in FIG. 2, the switch circuit 50 can include a step up circuit 58 for generating the high level switching signal 54 as a function of the input reference signal 26. The high level switching signal 54 has a voltage level greater than the input reference signal 26. The voltage step up circuit 58 can include a resistor R3 and a supplemental power source I1, such as a current source. The resistor R3 is coupled in series with the supplemental power source I1, and the serial combination of resistor R3 and power source I1 is operably coupled between the input reference signal 26 and the primary power signal Vdd. The high level switching signal 54 can then be generated at node VH, where power source I1 and resistor R3 are coupled together.

The switch circuit 50 can also include a step down circuit 60 for generating the low level switching signal 56 as a function of the input reference signal 26. The low level switching signal 56 has a voltage level less than the input reference signal 26. The voltage step down circuit 60 can include a resistor R4 and a supplemental power source I2, such as a current source. The resistor R4 is coupled in series with the supplemental power source I2, and the serial combination of resistor R4 and power source I2 is operably coupled between the input reference signal 26 and the ground signal GND. The low level switching signal 56 can then be generated at node VL, where power source I2 and resistor R4 are coupled together.

In another aspect of the invention, the receiver can include a routing switch 62. The routing switch 62 is operably coupled between the switch circuit 50 and the comparator 52. The routing switch receives the low level switching signal 56 and the high level switching signal 54 as inputs from the switch circuit 50. The routing switch 62 generates a processed switch signal 70 as an output to the comparator 52. The routing switch 62 also receives as an input control signal the output signal 66 from comparator 52.

In operation, the routing switch 62 in combination with the comparator 52 provides for a comparator with hysterisis. For instance, if the digital data signal 20 forces the output signal 66 low, then the routing switch 62 is forced to route the high level switching signal 54 through to comparator 52. Accordingly, for the output signal 66 to change to a high, the input digital data signal 20 must exceed the value of the high level switching signal 54. Once the input digital data signal 20 is driven to a high level that exceeds signal 54, then the output signal 66 is driven high by comparator 52. The output signal 66 then forces the routing switch to route the low level switching signal 56 through to comparator 52. Accordingly, for the output signal 66 to now change to a low, the input digital data signal 20 must be less than the value of the low level reference signal 56.

By appropriately choosing the values of the supplemental power sources I1, I2 and the values of the resistors R3, R4 the desired level of hysterisis can be achieved. Preferably, the values of the supplemental power source I1 and I2 are equal, so that no net DC current flow occurs on the input line for the reference signal 26. If the values of I1 and I2 are equal, the values of R3 and R4 can then be chosen to set Switching signals 54 and 56 to appropriate voltages that optimize system performance.

FIG. 3 is a timing diagram showing an exemplary change over time of the reference signal 26. As illustrated, the voltage level of the reference signal 26 stays between Vdd at the chip and GND at the chip at all times. Accordingly, the voltage level of the reference signal stays between a logic level low and a logic level high of the digital data signal 20.

Further features of the invention provide for a reference signal 26 that stays approximately midway between the logic level low and logic level high voltages. As shown in FIG. 3, the reference voltage stays approximately midway between Vdd and GND. The reference signal 26 typically changes in proportion to the changes in the Vdd signal or the GND signal. In particular, when the GND signal falls by 1 volt, the reference signal falls by ½ volt; See time index 1–2. When the GND signal rises by 1 volt, the reference signal rises by ½ volt; See time index 3–4. Similarly, the reference signal proportionally mirrors the changes of the Vdd signal; See time index 5–7.

In operation, the illustrated system provides for a method of transmitting the digital data signal 20 in a noisy environment. In accordance with this method, the electronic component 10 transmits a digital data signal 20, generates a reference signal 26, and transmits the reference signal. The reference signal 26 has a voltage level between a logic level low and a logic level high of the digital data signal 20. The reference signal can be used to identify the center point of the transmitting device logic levels. Furthermore, the reference signal allows the receiver to track and compensate for noise introduced at the transmitter of the digital data signal While the invention has been shown and described having reference to specific preferred embodiments, those skilled in the art will recognize that variation in form and detail may be made without departing from the spirit and scope of the invention. Thus, specific details of the disclosure herein are not intended to be necessary limitations on the scope of the invention other than as required by the prior art.

I claim:

1. In the manufacture of an electronic component from an integrated circuit and a package having parasitic inductance, the integrated circuit comprising:

a transmitter for transmitting a digital data signal, and a reference circuit for generating and transmitting a reference signal, the reference signal being at a voltage between a logic level low and a logic level high of the digital data signal, wherein the reference circuit includes a pair of resistive elements placed in series between a power source and a return for the power source, such that the reference signal is generated at the connection between the pair of resistive elements.

2. The integrated circuit according to claim 1, wherein the reference circuit generates a reference signal that varies such that the reference signal voltage remains approximately midway between a variable logic level low and a variable logic level high.

3. The integrated circuit according to claim 1, wherein the pair of resistive elements have approximately equal resistance.

4. The integrated circuit according to claim 1, wherein the reference circuit generates a reference signal having a voltage that is approximately midway between the logic level low and the logic level high.

5. The integrated circuit according to claim 1, wherein the reference circuit generates a reference signal having a voltage level dependent upon the level of parasitic inductance in the electronic component.

6. A receiver for receiving a digital signal, comprising:

a switch circuit for generating a switching point signal as a function of an input reference signal, the switching point signal identifying the transition between a logic level low and a logic level high in the received digital signal, a comparator for comparing the received digital signal with the switching point signal in order to determine whether the received digital signal is a logic level low or a logic level high; and a routing switch operably coupled between the switch circuit and the comparator,the routing switch receiving the low level switching signal and the high level switching signal as inputs from the switch circuit, and the routing switch generating a processed switching signal as an output to the comparator.

7. The receiver according to claim 6, further comprising an input line for receiving the reference signal.

8. The receiver according to claim 6, wherein the switch circuit includes a voltage step down circuit for generating a low level switching signal as a function of the input reference signal, the low level switching signal being at a voltage level less than the input reference signal.

9. The receiver according to claim 8, wherein the voltage step down circuit further comprises a resistor in series with a supplemental power source, wherein the combination of the resistor and the supplemental power source is operably coupled between the input reference signal and a ground signal.

10. The receiver according to claim 6, wherein the switch circuit includes a voltage step up circuit for generating a high level switching signal as a function of the input reference signal, the high level switching signal being at a voltage greater than the input reference signal.

11. The receiver according to claim 10, wherein the voltage step up circuit further comprises a resistor in series with a supplemental power source, wherein the combination of the resistor and the supplemental power source is operably coupled between the input reference signal and a primary power signal.

12. The receiver according to claim 6, wherein switch circuit includes circuitry for generating a high level switching signal and a low level switching signal as a function of the input reference signal.

13. A receiver for receiving a digital signal, comprising:

a switch circuit for generating a switching point signal as a function of an input reference signal, the switching point signal identifying the transition between a logic level low and a logic level high in the received digital signal, a comparator for comparing the received digital signal with the switching point signal in order to determine whether the received digital signal is a logic level low or a logic level high; and a routing switch operably coupled between the switch circuit and the comparator, the routing switch receiving the low level switching signal and the high level switching signal as inputs from the switch circuit, and the routing switch generating a processed switching signal as an output to the comparator, wherein the routing switch outputs either the low level switching signal or the high level switching signal to the comparator as a function of the output of the comparator.

* * * * *